(12) United States Patent
Eguchi et al.

(10) Patent No.: US 7,899,254 B2
(45) Date of Patent: Mar. 1, 2011

(54) METHOD AND DEVICE FOR RESTORING DEGRADED INFORMATION

(75) Inventors: Mitsuo Eguchi, Saitama (JP); Tetsuhiko Yoshida, Nagoya (JP)

(73) Assignees: Lightron Co., Ltd., Saitama (JP); Toagosei Co., Ltd., Tokyo (JP)

( * ) Notice: Subject to any disclaimer, the term of this patent is extended or adjusted under 35 U.S.C. 154(b) by 967 days.

(21) Appl. No.: 11/665,011

(22) PCT Filed: Oct. 13, 2005

(86) PCT No.: PCT/JP2005/018865
§ 371 (c)(1),
(2), (4) Date: Apr. 10, 2007

(87) PCT Pub. No.: WO2006/041126
PCT Pub. Date: Apr. 20, 2006

(65) Prior Publication Data
US 2008/0095358 A1    Apr. 24, 2008

(30) Foreign Application Priority Data
Oct. 14, 2004    (JP) .............................. 2004-300207

(51) Int. Cl.
*G06K 9/46* (2006.01)
(52) U.S. Cl. ..................................... 382/191
(58) Field of Classification Search .................. 382/191
See application file for complete search history.

(56) References Cited

U.S. PATENT DOCUMENTS 5,414,782 A * 5/1995 Carasso ....................... 382/270
5,627,918 A * 5/1997 Carasso ....................... 382/254
5,636,295 A * 6/1997 Kim ........................... 382/251
6,154,574 A * 11/2000 Paik et al. .................... 382/255

(Continued)

FOREIGN PATENT DOCUMENTS

JP    A 7-334668    12/1995

(Continued)

OTHER PUBLICATIONS

Bakkar et al, A parallel implementation of R-L algorithm—De-Blurring,Plenum,XP 000683753, Mar. 1997,pp. 555-575.*

(Continued)

*Primary Examiner*—Samir A Ahmed
*Assistant Examiner*—Jayesh Patel
(74) *Attorney, Agent, or Firm*—Oliff & Berridge, PLC

(57) ABSTRACT

The present invention provides a technology which precisely restores a distribution of original information by carrying out an iterative calculation based on a distribution of degraded information and a transfer function including a phase characteristic of a transfer system. A method according to the present invention restores the original information using the degraded information and the transfer function in the frequency space. The method according to the present invention considers a distribution of the degraded information and a distribution of the original information as distributions of probability density functions, and considers the transfer function as a probability density function of a conditional probability. The most probable distribution of the original information according to the distribution of the degraded information is acquired by the iterative calculation by means of relational equations based on the Bayes' theorem relating to the probability density functions.

3 Claims, 9 Drawing Sheets

U.S. PATENT DOCUMENTS

| | | | |
|---|---|---|---|
| 6,200,266 | B1 | 3/2001 | Shokrollahi et al. |
| 6,459,818 | B1 * | 10/2002 | George .................... 382/254 |
| 6,485,423 | B2 * | 11/2002 | Angelsen et al. .......... 600/458 |
| 6,547,139 | B1 * | 4/2003 | Havens et al. .............. 235/454 |
| 7,228,005 | B1 * | 6/2007 | Yuan ........................ 382/280 |
| 7,260,270 | B2 | 8/2007 | Kusaka |
| 7,444,014 | B2 * | 10/2008 | Dresser et al. ............ 382/154 |
| 2002/0156821 | A1 * | 10/2002 | Caron ....................... 708/315 |
| 2003/0190090 | A1 * | 10/2003 | Beeman et al. ............ 382/284 |
| 2004/0062453 | A1 * | 4/2004 | Ludwig ..................... 382/280 |
| 2004/0228520 | A1 | 11/2004 | Dresser et al. |
| 2009/0013020 | A1 | 1/2009 | Eguchi et al. |

FOREIGN PATENT DOCUMENTS

| | | |
|---|---|---|
| JP | A 11-258057 | 9/1999 |
| JP | A 2000-123168 | 4/2000 |
| JP | A 2004-186901 | 7/2004 |
| WO | WO 2004/075107 A2 | 9/2004 |

OTHER PUBLICATIONS

Hadar et al., Restoration of images degraded—vibrations, 0030-3992(97)00002-9, Elsevier, 1997,pp. 171-177.*

A parallel implementation of Richardson—De-blurring, Bakkar et al, XP 000683753, Journal vol. 18, 1997 pp. 555-575.*

Restoration of images degraded—vibrations, Hadar et al., Elsevier, 0030-3992, 1997 pp. 171-177.*

Bayesian based—Restoration, Richardson William, Journal of Optical society, vol. 62, No. 1, 1972, pp. 55-59.*

Office Action issued in European Patent Application No. 05 793 661.9 by the European Patent Office on Jan. 28, 2010.

Van Kempen et al., "A quantitative comparison of image restoration methods for confocal microscopy," Journal of Micoscopy, vol. 185, Pt 3, Mar. 1, 1997, pp. 354-365, Wiley-Blackwell Publishing Ltd., Great Britain.

O'Sullivan et al., "Information—Theorectic Image Formation," IEEE Transactions on Information Theory, vol. 44, No. 6, pp. 2094-2123, Oct. 1, 1998, IEEE, US.

W. H. Richardson, "Bayesian-Based Iterative Method of Image Restoration", Journal of the Optical Society of America, vol. 62 No. 1, Jan. 1972, pp. 55-59.

L. B. Lucy, "An Iterative Technique for the Rectification of Observed Distributions", The Astronomical Journal, vol. 79, No. 6 Jun. 1974, pp. 745-754.

Al-Bakkar et al., "A Parallel Implementation of a Modified Richardson-Lucy Algorithm for Image De-Blurring," *International Journal of Infrared and Millimeter Waves*, vol. 18, No. 3, Mar. 1997, pp. 555-575.

Faulkner et al., "Computational aberration determination and correction," *Optics Communications*, vol. 216, No. 1-3, Feb. 2003, pp. 89-98.

Foreign Office Action mailed Jul. 8, 2010 in Korean Application No. 7010929 (with partial translation).

Sep. 24, 2010 Office Action for U.S. Appl. No. 11/664,990.

Japanese Office Action in Japanese Patent Application No. 2006-540968 mailed on Apr. 27, 2010. (with English-language translation).

* cited by examiner

METHOD AND DEVICE FOR RESTORING DEGRADED INFORMATION

TECHNICAL FIELD

The present invention relates to the restoration of degraded information. More particularly, the present invention relates to a method and a device for restoring original information based on information degraded by transfer, and characteristics of a transfer system.

BACKGROUND ART

Demand exists for a means of precisely estimating original information using information degraded by transfer. In this case, estimation by means of a transfer function for a transfer system is generally used. If the transfer function of the transfer system is known, and the transfer function takes non-zero value for an entire frequency domain of the original information, it is possible to completely restore the original information from the information obtained after the transfer by means of an inverse filter of the transfer function.

Restoration by means of the above method cannot be directly applied to a case where the transfer function takes a value of zero in certain frequency domain. This is because the inverse filter cannot be defined in the frequency domain where the transfer function takes a value of zero. Thus, the information in the frequency domain where the transfer function takes a value of zero is lost in the course of the transfer in this transfer system. In other words, when information is transferred, the information is not transferred as the exact original; instead it is degraded in the course of the transfer. If an image is transferred in an optical system, for example, the image is degraded resulting in the loss of fine and detailed portions, namely portions with high spatial frequencies, due to aberrations and errors in the devices, and the image is recognized in the degraded state.

There have been technologies proposed to restore degraded information due to losses in specific frequency domain in the course of transfer based on the transfer characteristics of a transfer system and the information after degradation. The technologies for restoring degraded information have been proposed mainly in the field of image processing. Regarding the technology for restoring a degraded image, there is a known method that employs the Richardson-Lucy algorithm, described in W. H. Richardson, "Bayesian-based iterative method of image restoration", Journal of Optical Society of America, United States, 1972, volume 62, pp 55-59, and L. B. Lucy, "An iterative technique for the rectification of observed distributions", Astronomical Journal, United States, 1974, volume 79, pp 745-754.

The method employing the Richardson-Lucy algorithm recognizes the formation of light in an image as one event, and restores the original image by means of a method used in a technical field of probability and statistics. The method employing the Richardson-Lucy algorithm normalizes a distribution of illuminance for an original image to recognize the distribution as the distribution of a probability density function for an event of image formation of light on the original image. Moreover, the method normalizes a distribution of illuminance for a degraded image to recognize the distribution as the distribution of a probability density function for an event of image formation of light on the degraded image. A point spread function (PSF), which is a transfer characteristic of an optical system, can be recognized as the distribution of a probability density function of a conditional probability, which represents the distribution of the probability that light forms an image on the degraded image based upon the condition that a point of light forms an image on the original image. The method employing the Richardson-Lucy algorithm estimates, using an iterative calculation, the most probable distribution of distributions for the original image that will realize the distribution of the degraded image based on the distribution of the degraded image and the distribution of the PSF according to the Bayes' theorem. The distribution of the PSF may be calculated from the parameters of the optical system or may be calculated by experimentally acquiring a distribution of an image by actually transferring a point image.

Though the method employing the Richardson-Lucy algorithm is a method to restore a degraded image, the same method may be used to restore original information from degraded information for other types of information such as the history of an electric potential.

DISCLOSURE OF THE INVENTION

Problems to be Solved by the Invention

It is possible to employ the Richardson-Lucy algorithm to restore a degraded image fairly well. Even if an original image includes characters, and the characters are degraded to the extent of being illegible on the degraded image, the characters can be restored to such a degree that one can manage to recognize them on an original image estimated according to the Richardson-Lucy algorithm.

However, there is still the capacity for improvement of the technology that utilizes the Richardson-Lucy algorithm.

The Richardson-Lucy algorithm estimates an original image using only a PSF and a degraded image. The PSF represents a distribution of the intensity of light from a point light source which is transferred by a carrier wave and forms an image on an image surface, and does not take into account the phase characteristic of the carrier wave. If the influence exerted by a transfer system on the phase of the carrier wave is known, it is thought that a more precise estimation can be carried out by taking into account the influence.

In order to estimate the original information more precisely than the current method employing the Richardson-Lucy algorithm, it is necessary to provide a technology which realizes a restoration method which considers the phase characteristic of a transfer system, and employs the phase characteristic to restore original information if the phase characteristic is known.

The present invention solves the above problem. The present invention provides a technology which precisely restores a distribution of original information by carrying out an iterative calculation based on a distribution of degraded information and a transfer function including the phase characteristic of a transfer system.

Moreover, the present invention provides a technology which can suitably encrypt and decrypt information by applying the technology for restoring degraded information.

Means for Solving the Problems

A method according to the present invention is a method for restoring original information from degraded information including a step of identifying a distribution of degraded information, a step of identifying a transfer function for a transfer from the original information to the degraded information as a function in the frequency space, and a step of identifying an initial estimated distribution of the original information. Moreover, the method includes, as a single cycle, the steps of (1) acquiring a first function by applying a Fourier transform to the estimated distribution of the original information, (2) acquiring a second function by multiplying the first function by the transfer function, (3) acquiring a third function by applying an inverse Fourier transform to the second function, (4) acquiring a fourth function by dividing the distribution of the degraded information by the third function, (5) acquiring a fifth function by applying a Fourier transform to the fourth function, (6) acquiring a sixth function by multiplying the fifth function by an inverse function of the transfer function, (7) acquiring a seventh function by applying an inverse Fourier transform to the sixth function, and (8) acquiring a next estimated distribution of the original information by multiplying the estimated distribution of the original information by the seventh function. Furthermore, the method includes a step of replacing the estimated distribution of the original information with the next estimated distribution of the original information acquired in the step (8), and repeating the steps (1) to (8), and a step of outputting restored original information based on the estimated distribution of the original information acquired by repeating the cycle multiple times.

Though the information handled by the method according to the present invention is not limited to images, and the present invention may be applied to a history of an electric signal, for example, a description of a principle of the method according to the present invention will be given for a case where an image is handled as the information.

The method according to the present invention estimates an original image by means of an iterative calculation using a degraded image and a transfer characteristic based on the Bayes' theorem. A description will be given of a case where a black and white original image is transferred via a certain optical system, and a degraded black and white image is formed. In the following section, it is assumed that the sizes of the original image and the degraded image are the same, a point on the images can be represented as a coordinate (x,y), and an illuminance distribution of the original image and an illuminance distribution of the degraded image are respectively represented as $f_r(x,y)$ and $g_r(x,y)$. As a transfer characteristic of the optical system, an optical transfer function (OTF) is used instead of a point spread function (PSF).

The spectrum of a spatial frequency s corresponding to x and a spatial frequency t corresponding to y are acquired by applying a two-dimensional Fourier transform to the distributions $f_r(x,y)$ and $g_r(x,y)$ of the original image.

[Equation 1]

$$F_r(s,t)=FT(f_r(x,y))(s,t)=\int_{-\infty}^{\infty}\int_{-\infty}^{\infty}f_r(x,y)e^{j(sx+ty)}dxdy \quad (1)$$

[Equation 2]

$$G_r(s,t)=FT(g_r(x,y))(s,t)=\int_{-\infty}^{\infty}\int_{-\infty}^{\infty}g_r(x,y)e^{j(sx+ty)}dxdy \quad (2)$$

The OTF refers to the following complex function $H_r(s,t)$ where $F_r(s,t)$ is the spatial spectrum of the distribution $f_r(x,y)$ of the original image and $G_r(s,t)$ is the spatial spectrum of the distribution $g_r(x,y)$ of the degraded image.

[Equation 3]

$$G_r(s,t)=F_r(s,t)\cdot H_r(s,t) \quad (3)$$

For a general optical system, it is possible to acquire the distribution $g_r(x,y)$ of an image after degradation by means of $H_r(s,t)$, which is an OTF determined by the optical system and imaging conditions, for the distribution $f_r(x,y)$ of any original image.

The OTF, which is a complex function, is represented by a modulation transfer function (MTF) $M_r(s,t)$, which represents the magnitude of the complex amplitude, and a phase transfer function (PTF) $P_r(s,t)$, which represents the phase shift, as:

[Equation 4]

$$H_r(s,t)=M_r(s,t)e^{jP_r(s,t)} \quad (4)$$

It is possible to precisely evaluate the characteristic relating to the phase of the optical system by means of the OTF. The OTF can be calculated from characteristic parameters of the optical system.

The method according to the present invention handles the distribution of the original image and the distribution of the degraded image as probability density functions, and estimates the original image based on the Bayes' theorem. The distribution $f_r(x,y)$ of the original image and the distribution $g_r(x,y)$ of the degraded image as specified above can be treated as probability density functions by the following normalization.

[Equation 5]

$$f(x,y) = \frac{f_r(x,y)}{\int_{-\infty}^{\infty}f_r(x,y)dxdy} \quad (5)$$

[Equation 6]

$$g(x,y) = \frac{g_r(x,y)}{\int_{-\infty}^{\infty}g_r(x,y)dxdy} \quad (6)$$

In correspondence to the above normalization, the optical transfer function $H_r(s,t)$ is also normalized. The optical transfer function $H_r(s,t)$ is normalized based on a value at a point where the spatial frequency is 0 (zero).

[Equation 7]

$$H(s,t) = \frac{H_r(s,t)}{H_r(0,0)} \quad (7)$$

The normalized distribution f(x,y) of the original image and the normalized distribution g(x,y) of the degraded image are non-negative functions, have the integral of 1 within a defined area, and thus can be treated as probability density functions. In the above case, the distribution f(x,y) represents a probability density function of an event in which an image is formed at a coordinate (x,y) on the original image. Moreover, the distribution g(x,y) represents a probability density function of an event in which an image is formed at a coordinate (x,y) on the degraded image.

If the distributions of the original image and the degraded image can be considered as probability distribution functions, it is possible to estimate the distribution of the original image, from which the degraded image was generated, from the distribution of the degraded image based on the Bayes' theorem.

If an event, in which a point light source is present at a coordinate $(x_1, y_1)$ on the original image, is denoted as $V(x_1, y_1)$, and an event in which a point image is formed at a coordinate $(x_2, y_2)$ on the degraded image is $A(x_2, y_2)$, probabilities P(V) and P(A) of the respective events are represented as:

[Equation 8]

$$P(V(x_1,y_1))=f(x_1,y_1) \quad (8)$$

[Equation 9]

$$P(A(x_2,y_2))=g(x_2,y_2) \quad (9)$$

Moreover, the probability that an image is formed at the coordinate $(x_2, y_2)$ on the degraded image if a point light source is present at the coordinate $(x_1, y_1)$ on the original image is an occurrence probability of the event $A(x_2,y_2)$ under the condition of the occurrence of the event $V(x_1, y_1)$. This probability is represented by h(x,y), which is a PSF of the optical system, as:

[Equation 10]

$$P(A(x_2,y_2)|V(x_1,y_1)) = h(x_2-x_1, y_2-y_1) \quad (10)$$

The distribution of the original image $P(V(x,y)|A(x_2,y_2))$, which forms a point image at the point $(x_2,y_2)$ on the degraded image, is estimated based on the Bayes' theorem by:

[Equation 11]

$$P(V(x,y)|A(x_2,y_2)) = \frac{p(V(x,y))p(A(x_2,y_2)|V(x,y))}{p(A(x_2,y_2))} \quad (11)$$

$$= \frac{p(V(x,y))p(A(x_2,y_2)|V(x,y))}{\int_{-\infty}^{\infty}\int_{-\infty}^{\infty} p(V(x_1,y_1)) p(A(x_2,y_2)|V(x_1,y_1)) dx_1 dy_1}$$

The following equation is obtained by respectively assigning equation (8) and equation (10) to $P(V(x,y))$, $P(A(x_2,y_2)|V(x,y))$ on the right side of the above equation.

[Equation 12]

$$P(V(x,y)|A(x_2,y_2)) = \frac{f(x,y)h(x_2-x, y_2-y)}{\int_{-\infty}^{\infty}\int_{-\infty}^{\infty} h(x_2-x_1, y_2-y_1)f(x_1,y_1)dx_1 dy_1} \quad (12)$$

The left side of the above equation represents an estimated distribution of the original image if a point image is formed on the degraded image. It is possible to obtain the distribution $f(x,y)$ of the original image which realizes the distribution $g(x,y)$ of the degraded image by multiplying the above equation by the distribution $g(x,y)$ of the degraded image, and then integrating the resulting equation.

The following equation is obtained by multiplying the both sides of the above equation by $P(A(X_2,y_2)) = g(x_2,y_2)$, and carrying out an integration for all $(x_2,y_2)$.

[Equation 13]

$$\int_{-\infty}^{\infty} P(V(x,y)|A(x_2,y_2))g(x_2,y_2)dx_2 dy_2 = \quad (13)$$

$$f(x,y)\int_{-\infty}^{\infty} \frac{h(x_2-x, y_2-y)g(x_2,y_2)}{\int_{-\infty}^{\infty} h(x_2-x_1, y_2-y_1)f(x_1,y_1)dx_1 dy_1} dx_2 dy_2$$

If equation (9) is assigned to the left side of the above equation, the integration results in $P(V(x,y))$, which is equal to $f(x,y)$. As a result, the following relationship holds based on the Bayes' theorem.

[Equation 14]

$$f(x,y) = f(x,y)\int_{-\infty}^{\infty} \frac{h(x_2-x, y_2-y)g(x_2,y_2)}{\int_{-\infty}^{\infty} h(x_2-x_1, y_2-y_1)f(x_1,y_1)dx_1 dy_1} dx_2 dy_2 \quad (14)$$

The above relationship is considered to hold if the distribution $f(x,y)$ is a true distribution of the original image. In other words, calculating the distribution $f(x,y)$ which satisfies the above equation corresponds to the restoration of the degraded image.

The method according to the present invention sets $f(x,y)$ on the right side of equation (14) to $f_k(x,y)$, and sets $f(x,y)$ on the left side of equation (14) to $f_{k+1}(x,y)$, carries out an iterative calculation for $f_k(x,y)$, and acquires a converged value of $f_k(x,y)$. The converged value of $f_k(x,y)$ obtained by the iterative calculation is output as an estimated distribution of the original image based on the Bayes' theorem.

Though a description has been given of the case where the distribution $f(x,y)$ of the original image and the distribution $g(x,y)$ of the degraded image are normalized, these distributions may be directly used without normalization for the actual iterative calculation.

For the iterative calculation, an initial estimated distribution $f_0(x,y)$ of the original image is set before the iterative calculation. An arbitrary distribution may be set as the initial estimated distribution $f_0(x,y)$. In general, since the distribution $g(x,y)$ of the degraded image is not largely different from the distribution $f(x,y)$ of the original image, the distribution $g(x,y)$ of the degraded image is preferably used as the initial estimated distribution $f_0(x,y)$.

The right side of equation (14) includes a convolution using $h(x,y)$, which is the PSF. In general, it is difficult to precisely evaluate a PSF that includes the phase characteristic of an optical system, and it is thus difficult to carry out the iterative calculation including the precise phase characteristic. Since an iterative calculation that uses a PSF which does not include a precise phase characteristic results in a false convergence, it thus prevents an original image from being precisely restored.

The method according to the present invention uses an OTF, which can easily include a precise phase characteristic, instead of the PSF. Moreover, in order to precisely evaluate the phase characteristic in the process of the restoration, the estimated distribution $f_k(x,y)$ ($k=0, 1, 2, \ldots$) of the original image is expanded into a complex function, and the real part thereof is considered to represent the image distribution. The form of the right side of the above equation can be changed using the OTF by applying a Fourier transform and an inverse Fourier transform. If the Fourier transform and the inverse Fourier transform are respectively denoted by FTO and $FT^{-1}$ ( ), equation (14) is represented as:

[Equation 15]

$$f_{k+1}(x,y) = f_k(x,y)FT^{-1} \quad (15)$$

$$\left(FT\left(\int_{-\infty}^{\infty} \frac{h(x_2-x, y_2-y)g(x_2,y_2)}{FT^{-1}(FT(\int_{-\infty}^{\infty} h(x_2-x_1, y_2-y_1)f_k(x_1,y_1)dx_1 dy_1))} dx_2 dy_2\right)\right)$$

$$= f_k(x,y)FT^{-1}\left(FT\left(\int_{-\infty}^{\infty} \frac{h(x_2-x, y_2-y)g(x_2,y_2)}{FT^{-1}(H(s,t) \cdot FT(f_k)(s,t))(x_2,y_2)} dx_2 dy_2\right)\right)$$

$$= f_k(x,y)FT^{-1}\left(FT\left(\frac{g}{FT^{-1}(FT(f_k) \cdot H)}\right)(s,t) \cdot H(-s,-t)\right)$$

It is possible to estimate the original image by repeating the iterative calculation until $f_k$ converges. It is possible to determine whether $f_k$ has converged or not by setting the number of iterations and determining whether the set number has been reached, by calculating the difference between $f_k$ and $f_{k+1}$ and determining whether the absolute value of the calculated difference is less than or equal to a certain threshold for all the coordinates (x,y), or by calculating the difference between $f_k$ and $f_{k+1}$ and determining whether the integral of the absolute value of the calculated difference for all the coordinates (x,y) is less than or equal to a certain threshold.

The restoration method employing the above principle can be realized by sequentially executing the following steps. The distribution of the original image estimated by the iterative calculation is denoted by $f_k$ (k=0, 1, ... ) in the following section. The estimated distribution $f_k$ of the original image is treated as a complex function in order to precisely evaluate the characteristic related to the phase in the process of the restoration.

First, H(s,t), which is an OTF, is identified based on the characteristics of the transfer system.

As an initial estimated distribution of the original image, the real part of $f_0(x,y)$ is set to g(x,y), and the imaginary part of $f_k(x,y)$ is set to zero.

Then, the following calculation is repeated until $f_k(x,y)$ converges. On this occasion, FT( ) denotes a two-dimensional Fourier transform, and $FT^{-1}$( ) denotes a two-dimensional inverse Fourier transform. Moreover, $H^\#(s,t)$ denotes an inverse function of H(s,t), and therefore $H^\#(s,t)=H(-s,-t)$ holds.

[Equation 16]
$$f_{k+1} = f_k \cdot FT^{-1}(FT(L) \cdot H^\#) \tag{16}$$

[Equation 17]
$$L = \frac{g}{FT^{-1}(FT(f_k) \cdot H)} \tag{17}$$

[Equation 18]
$$H^\#(s, t) = H(-s, -t). \tag{18}$$

The above iterative calculation is repeated, and a final estimated distribution $f_k$ of the original image is acquired. The real part of the final estimated distribution $f_k(x,y)$ of the original image acquired is output as the restored image f(x,y) of the original image.

The above method enables the iterative calculation by means of an OTF which takes into account of the precise phase characteristic as the transfer characteristic of the transfer from an original image to a degraded image. It is thus considered that a more precise estimation is enabled compared to the case where the Richardson-Lucy algorithm is employed.

The inventors practiced the above method, and confirmed that an original image was restored more precisely than in the case where the Richardson-Lucy algorithm was employed.

The above method can estimate an original image by means of only the Fourier transform, the inverse Fourier transform, and addition, subtraction, multiplication, and division operations without a convolution. As a result, it is possible to significantly reduce the time required for processing in comparison to a case where the Richardson-Lucy algorithm is employed.

The above method can be applied to encryption and decryption of information. If a transfer system, which removes a specific frequency band, is used to degrade information, a third party cannot directly recognize the contents of the degraded information. Thus, it is possible to encrypt information by using a transfer system, which has a predetermined transfer characteristic, to degrade the original information. Moreover, it is possible to decrypt the information, which has been encrypted by means of degradation, through a precise restoration by means of the method according to the present information.

Another method according to the present invention is a method for encrypting information including a step of identifying the distribution of the original information, a step of identifying a transfer function in the frequency space which removes a specific frequency component, a step of acquiring a first function by applying a Fourier transform to the distribution of the original information, a step of acquiring a second function by multiplying the first function by the transfer function, a step of producing a distribution of the encrypted information by applying an inverse Fourier transform to the second function, and a step of outputting a pair of data describing the produced distribution of the encrypted information and the transfer function.

The method according to the present invention first sets a distribution of the original information, and a transfer function in the frequency space which removes a specific frequency component. The transfer function can be selected arbitrarily.

The method according to the present invention degrades the information using the original information and the transfer function. It is possible to acquire a distribution of the information, which is produced by removing a specific frequency component from the original information, by applying the Fourier transform to the original information, multiplying a result thereof by the set transfer function, and applying the inverse Fourier transform to a result thereof. It is possible to encrypt the information by outputting a combination of data describing the encrypted information obtained as described above, and the transfer function used for the encryption.

The data to be output describing the transfer function may be a distribution of the transfer function itself, or may be parameters which specify a predetermined shape of the transfer function.

As a result of the encryption, information in a specific frequency domain is lost from the original information, resulting in degraded original information. Since the information content included in the encrypted information is smaller than the information content included in the original information, it is possible to compress the information content through the use of the above encryption method. When information is stored or transferred, the amount of data that requires manipulation can be reduced by encrypting the information using the method according to the present invention.

Information encrypted using the above method is decrypted by the following method. Another method according to the present invention is a method for decrypting encrypted information including a step of identifying a distribution of the encrypted information, and a transfer function in the frequency space, and a step of identifying an initial estimated distribution of original information. Moreover, the method includes, as a single cycle, the steps of (1) acquiring a first function by applying a Fourier transform to the estimated distribution of the original information, (2) acquiring a second function by multiplying the first function by the transfer function, (3) acquiring a third function by applying an inverse Fourier transform to the second function, (4) acquiring a fourth function by dividing the distribution of the encrypted information by the third function, (5) acquiring a fifth function by applying a Fourier transform to the fourth function, (6) acquiring a sixth function by multiplying the fifth function by an inverse function of the transfer function, (7) acquiring a seventh function by applying an inverse Fourier transform to the sixth function, and (8) acquiring a next estimated distribution of the original information by multiplying the estimated distribution of the original information by the seventh function. Furthermore, the method includes a step of replacing the estimated distribution of the original information with the next estimated distribution of the original information acquired in the step (8), and repeating the steps (1) to (8), and a step of outputting decrypted original information based on the estimated distribution of the original information.

The decryption method first identifies a distribution of the encrypted information and the transfer function used for the encryption. A distribution of the transfer function may be directly input, or parameters which specify a predetermined shape of the function may be input as the transfer function. It is possible to identify the distribution of the transfer function in either case.

After the encrypted information and the transfer function are identified as described above, it is possible to acquire a distribution of the original information by means of the iterative calculation based on the distribution of the encrypted information and the transfer function according to the above restoration method for degraded information.

It is possible to precisely estimate the original information using encrypted information which lacks in information in a specific frequency domain, by means of this decryption method.

The restoration method for degraded information and the encryption and decryption methods for information can all be implemented as programs which cause a computer to execute the respective steps of the appropriate method. FIG. 10 shows an example of a hardware configuration of the computer.

The restoration method for degraded information is preferably carried out by the following device. FIG. 7 exemplifies a functional block diagram of a device 1000 according to the present invention. The device 1000 according to the present invention is a device which restores the original information from degraded information. The device 1000 includes means 1002 for identifying a distribution of degraded information, means 1004 for identifying a transfer function for the transfer from the original information to the degraded information as a function in the frequency space, means 1006 for identifying an initial estimated distribution of the original information, (1) means 1008 for acquiring a first function by applying a Fourier transform to the estimated distribution of the original information, (2) means 1010 for acquiring a second function by multiplying the first function by the transfer function, (3) means 1012 for acquiring a third function by applying an inverse Fourier transform to the second function, (4) means 1014 for acquiring a fourth function by dividing the distribution of the degraded information by the third function, (5) means 1016 for acquiring a fifth function by applying a Fourier transform to the fourth function, (6) means 1018 for acquiring a sixth function by multiplying the fifth function by an inverse function of the transfer function, (7) means 1020 for acquiring a seventh function by applying an inverse Fourier transform to the sixth function, (8) means 1022 for acquiring a next estimated distribution of the original information by multiplying the estimated distribution of the original information by the seventh function, means 1024 for replacing the estimated distribution of the original information with the next estimated distribution of the original information, and repeating in order to cause the means (1) to (8) to execute processes thereof, and means 1026 for outputting restored original information based on the final estimated distribution of the original information.

The encryption method for information is preferably carried out by the following device. FIG. 8 exemplifies a functional block diagram of another device 1100 according to the present invention. This device 1100 according to the present invention is a device which encrypts information. The device 1100 includes means 1102 for identifying a distribution of original information, means 1104 for identifying a transfer function in the frequency space which removes a specific frequency component, means 1106 for acquiring a first function by applying a Fourier transform to the distribution of the original information, means 1108 for acquiring a second function by multiplying the first function by the transfer function, means 1110 for producing a distribution of encrypted information by applying an inverse Fourier transform to the second function, and means 1112 for outputting a pair of data describing the produced distribution of the encrypted information and the transfer function.

The decryption method for information is preferably carried out by the following device. FIG. 9 exemplifies a functional block diagram of another device 1200 according to the present invention. This device 1200 according to the present invention is a device which decrypts encrypted information. The device 1200 includes means 1202 for identifying a distribution of encrypted information, and a transfer function in the frequency space, means 1204 for identifying an initial estimated distribution of the original information, (1) means 1206 for acquiring a first function by applying a Fourier transform to the estimated distribution of the original information, (2) means 1208 for acquiring a second function by multiplying the first function by the transfer function, (3) means 1210 for acquiring a third function by applying an inverse Fourier transform to the second function, (4) means 1212 for acquiring a fourth function by dividing the distribution of the encrypted information by the third function, (5) means 1214 for acquiring a fifth function by applying a Fourier transform to the fourth function, (6) means 1216 for acquiring a sixth function by multiplying the fifth function by an inverse function of the transfer function, (7) means 1218 for acquiring a seventh function by applying an inverse Fourier transform to the sixth function, (8) means 1220 for acquiring a next estimated distribution of the original information by multiplying the estimated distribution of the original information by the seventh function, means 1222 for replacing the estimated distribution of the original information with the next estimated distribution of the original information, and repeating in order to cause the means (1) to (8) to execute processes thereof to acquire another estimated distribution of the original information, and means 1224 for outputting the decrypted original information based on the final estimated distribution of the original information.

EFFECTS OF THE INVENTION

It is possible to precisely restore a distribution of original information by utilizing an iterative calculation based on a corresponding distribution of degraded information and a transfer function including the phase characteristic of a transfer system by means of the method, the program, or the device for restoring degraded information according to the present invention. The method, program, and device can be applied to visualizations on the nanometer level of structures in the dynamic state including biological macromolecules such as peptides and proteins, and an image analysis in the field of astronomy.

Moreover, it is possible to preferably encrypt and decrypt information by means of the method, program, or device for encrypting and decrypting information according to the present invention.

EXPLANATION OF REFERENCE NUMERAL

Figure 1:
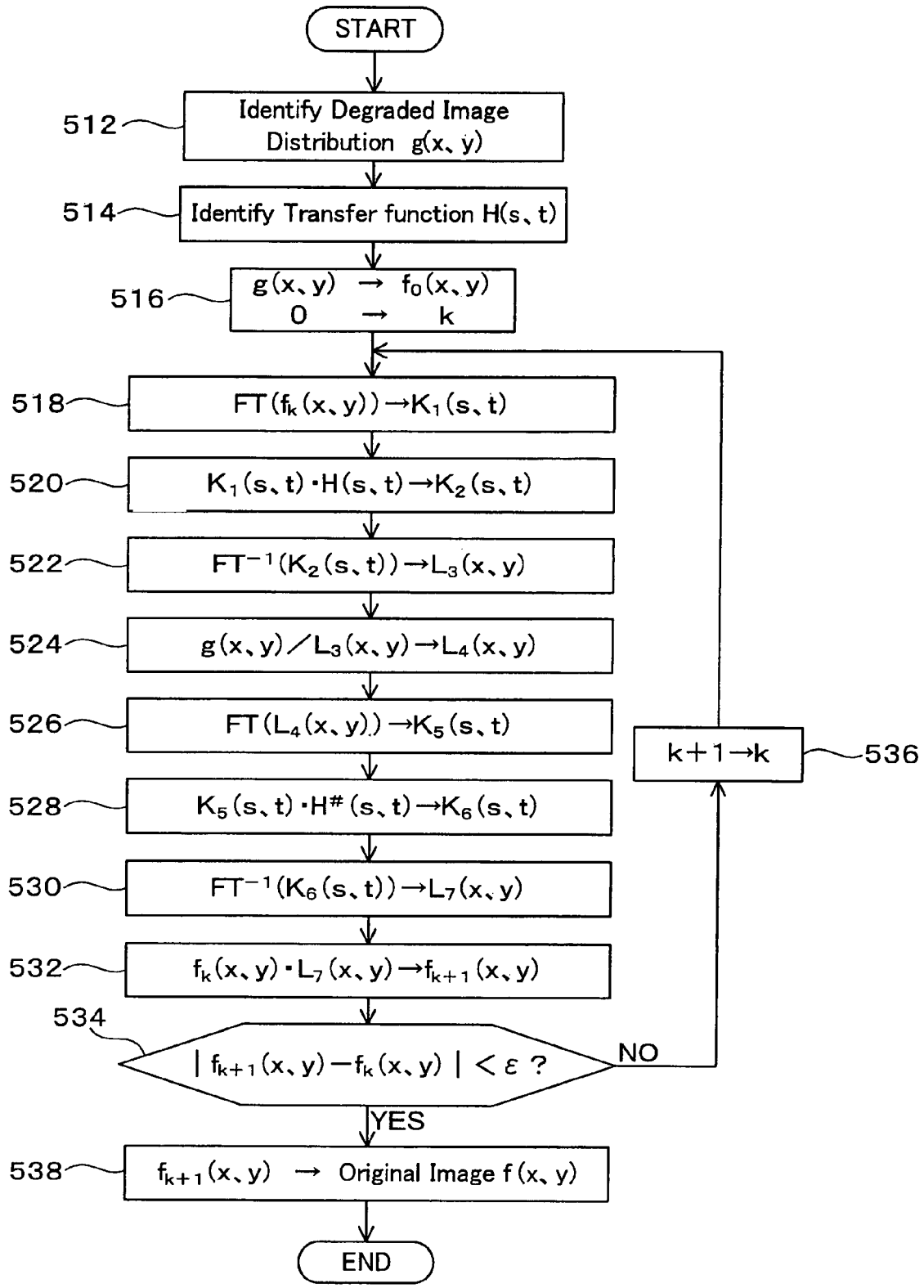
FIG. 1 is a flowchart of the method according to a first embodiment of the present invention.

10 . . . original image
12 . . . optical system
14 . . . degraded image
102 . . . degraded image
104 . . . PSF
106 . . . restored original image
114 . . . PSF
116 . . . PTF
118 . . . restored original image
512, 514, 516, 518, 520, 522, 524, 526, 528, 530, 532, 534, 536, 538 . . . respective steps of the image restoring method according to a first embodiment
612, 614, 616, 618, 620, 622 . . . respective steps of the encryption method according to a second embodiment
712, 714, 716, 718, 720, 722, 724, 726, 728, 730, 732, 734, 736 . . . respective steps of the decryption method according to the second embodiment
1000 . . . restoring device for degraded information
1002, 1004, 1006, 1008, 1010, 1012, 1014, 1016, 1018, 1020, 1022, 1024, 1026 . . . respective means constituting a restoring device for degraded information
1100 . . . encrypting device for information
1102, 1104, 1106, 1108, 1110, 1112 . . . respective means constituting an encrypting device for information
1200 . . . decrypting device for information
1202, 1204, 1206, 1208, 1210, 1212, 1214, 1216, 1218, 1220, 1222, 1224 . . . respective means constituting a decrypting device for information

BEST MODE FOR CARRYING OUT THE INVENTION

A description will now be given of embodiments of the present invention with reference to drawings. First, the main characteristics of the embodiments will be listed.

(Mode 1) A method for restoring an original image from a degraded image including:
a step of identifying a distribution of a degraded image,
a step of identifying an OTF of an optical system,
a step of identifying an initial estimated distribution of an original image,
(1) a step of acquiring a first function by applying a Fourier transform to the estimated distribution of the original image,
(2) a step of acquiring a second function by multiplying the first function by the OTF,
(3) a step of acquiring a third function by applying an inverse Fourier transform to the second function,
(4) a step of acquiring a fourth function by dividing the distribution of the degraded image by the third function,
(5) a step of acquiring a fifth function by applying a Fourier transform to the fourth function,
(6) a step of acquiring a sixth function by multiplying the fifth function by an inverse function of the OTF;
(7) a step of acquiring a seventh function by applying an inverse Fourier transform to the sixth function,
(8) a step of acquiring a next estimated distribution of the original image by multiplying the estimated distribution of the original image by the seventh function,
a step of replacing the estimated distribution of the original image with the next estimated distribution of the original image, and repeating the steps (1) to (8), and
a step of outputting the restored original image based on the estimated distribution of the original image.

EMBODIMENTS

First Embodiment

A description will be given of a method according to a present embodiment with reference to drawings. FIG. 1 is a flowchart describing the method according to the present embodiment.

Figure 2:
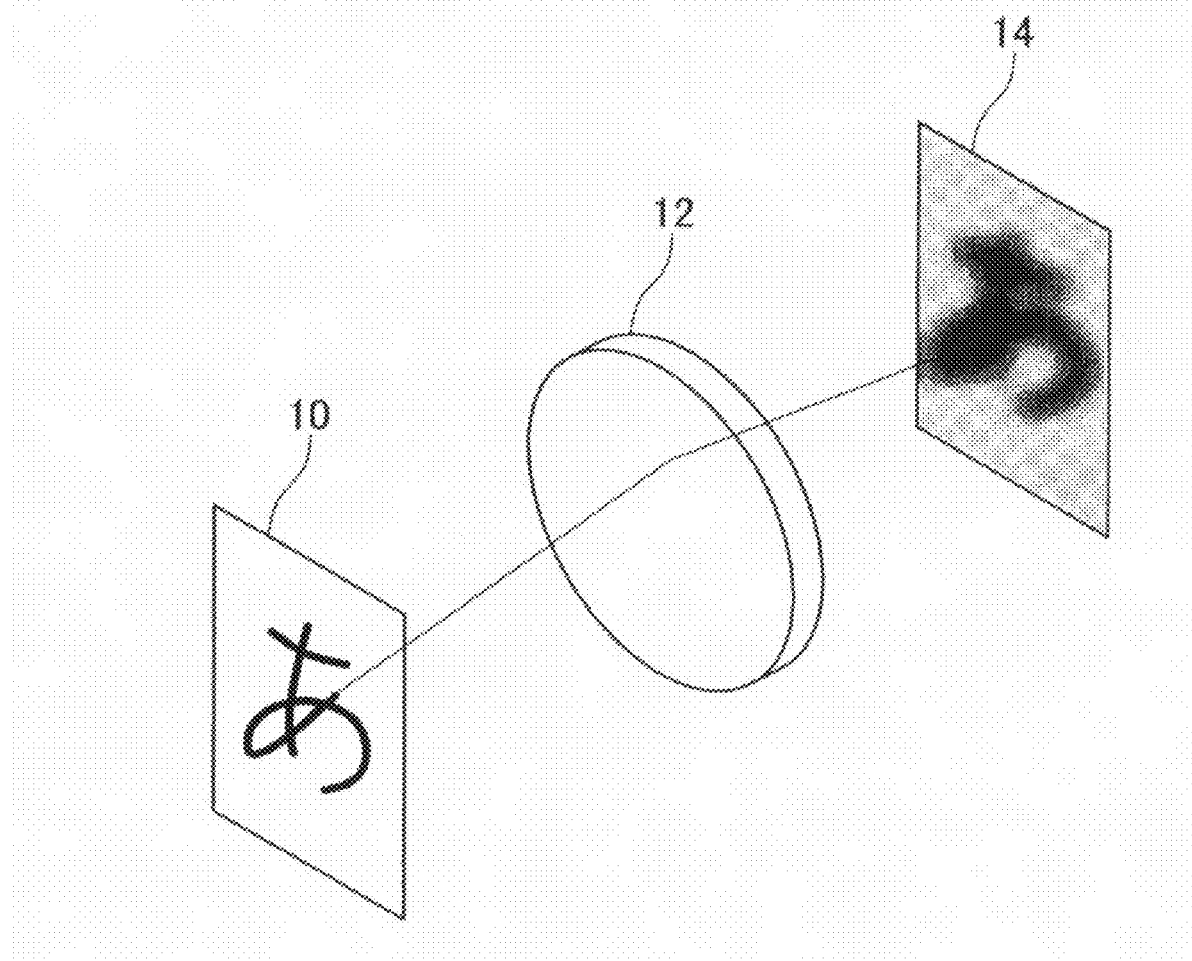
FIG. 2 schematically shows a transfer from an original image to a degraded image via an optical system.

As shown in FIG. 2, the present embodiment employs a method for restoring an original image 10 from a degraded image 14 when the black and white original image 10 is converted into the black and white degraded image 14 as a result of transfer through an optical system 12. In the above case, the method according to the present embodiment restores the black and white original image 10 by means of an iterative calculation using a transfer function of the optical system 12 and the black and white degraded image 14. The original image 10 and the degraded image 14 are the same in size, and a position on the images can be represented as coordinates (x,y).

According to the present embodiment, a distribution g(x,y) describing the degraded image 14 and a distribution $f_k(x,y)$ (k=0, 1, 2, . . . ) describing the original image 10 estimated in the process of the iterative calculation are treated as complex functions in order to take into account a phase characteristic of the respective images. According to the present embodiment, the real part of the distribution g(x,y) is the distribution of the illuminance for the degraded image, and the real part of the distribution $f_k(x,y)$ (k=0, 1, 2, . . . ) is an estimated distribution of the illuminance for the original image.

In the first step 512, the distribution g(x,y) for the degraded image is identified. According to the present embodiment, since the phase characteristic of g(x,y) is not known, the real part of g(x,y) is the distribution of the illuminance of the degraded image, and the imaginary part of g(x,y) is always zero.

Then, in the next step 514, H(s,t), which is the OTF of the optical system, is identified. H(s,t), which is the OTF of the optical system, is obtained by the following equation for a spatial frequency s in the x direction, and a spatial frequency t in the y direction.

[Equation 19]

$$H(s,t) = \iint P(s',t') \cdot P^*(s'-s, t'-t) ds' dt' \quad (19)$$

P in the above equation is a pupil function of the optical system, and is a complex function identified by the numerical aperture, the aberration, and the illumination wavelength of the optical system. The asterisk * in the equation denotes complex conjugate.

In the step 516, the distribution g(x,y) of the degraded image identified in the step 512 is set to an initial estimated distribution $f_0(x,y)$ of the original image. Moreover, the count k of the iterative calculation is set to zero.

In the step 518, the estimated distribution $f_k(x,y)$ of the original image is transformed by the Fourier transform, and a result thereof is set to a function $K_1(s,t)$. The function $K_1(s,t)$ corresponds to the first function. k is a non-negative integer, and is incremented in a subsequent step 534 in accordance with the number of completed iterative calculation cycles. FT( ) in FIG. 1 denotes a two-dimensional Fourier transform. This Fourier transform is carried out in terms of the spatial frequency on a two-dimensional plane, and is defined by the following equation.

[Equation 20]

$$K_1(s,t) = FT(f_k(x,y))(s,t) = \int_{-\infty}^{\infty} \int_{-\infty}^{\infty} f_k(x,y) e^{j(sx+ty)} dx dy \quad (20)$$

This Fourier transform can be preferably carried out by means of a fast Fourier transform.

In the step 520, the function $K_2(s,t)$ is calculated by multiplying the first function $K_1(s,t)$ set in the step 518 by the function H(s,t) identified in the step 514. The function $K_2(s,t)$ corresponds to the second function.

In the step 522, the second function $K_2(s,t)$ calculated in the step 520 is transformed by an inverse Fourier transform, and a result thereof is set to a function $L_3(x,y)$. The function $L_3(x,y)$ is a complex function, and corresponds to the third function. $FT^{-1}(\ )$ in FIG. 1 denotes a two-dimensional inverse Fourier transform. This inverse Fourier transform is defined by the following equation.

[Equation 21]

$$L_3(x,y) = FT^{-1}(K_2(s,t))(x,y) = \int_{-\infty}^{\infty} \int_{-\infty}^{\infty} K_2(s,t) e^{-j(sx+ty)} ds dt \quad (21)$$

In the step 524, a function $L_4(x,y)$ is calculated by dividing the degraded image distribution g(x,y) identified in the step 512 by the third function $L_3(x,y)$ set in the step 522. The function $L_4(x,y)$ is a complex function, and corresponds to the fourth function.

In the step 526, the fourth function $L_4(x,y)$ calculated in the step 524 is transformed by a Fourier transform, and a result thereof is set to a function $K_5(s,t)$. The function $K_5(s,t)$ corresponds to the fifth function.

In the step 528, the function $K_6(s,t)$ is calculated by multiplying the fifth function $K_5(s,t)$ set in the step 526 by $H^\#(s,t)$. $H^\#(s,t)$ denotes an inverse function of the function H(s,t) identified in the step 514, and there holds $H^\#(s,t) = H(-s,-t)$. The function $K_6(s,t)$ corresponds to the sixth function.

In the step 530, the sixth function $K_6(s,t)$ calculated in the step 528 is transformed by the inverse Fourier transform, and a result thereof is set to a function $L_7(x,y)$. The function $L_7(x,y)$ is a complex function, and corresponds to the seventh function.

In the step 532, an improved estimated distribution $f_{k+1}(x,y)$ of the original image is calculated by multiplying the estimated distribution $f_k(x,y)$ of the original image by the seventh function $L_7(x,y)$ set in the step 530. The seventh function is generally a complex function including the imaginary part, and it is thus possible to improve the estimated distribution of the original image including the phase characteristic according to the above method.

In the step 534, a difference between the improved estimated distribution $f_{k+1}(x,y)$ of the original image calculated in the step 532 and the estimated distribution $f_k(x,y)$ of the original image is calculated, and it is determined whether the absolute value thereof is less than a threshold ε for all the points (x,y). If the absolute value of the difference is greater than or equal to the threshold for a certain point (x,y) ("NO" in the step 534), it is determined that the improved estimated distribution $f_{k+1}(x,y)$ of the original image has not converged, and the process proceeds to a step 536. If the absolute value of the difference is less than the threshold ε for all the points (x,y) ("YES" in the step 534), it is determined that the improved estimated distribution $f_{k+1}(x,y)$ of the original image has converged, and the process proceeds to a step 538.

In the step 536, the count k for the iterative calculation is incremented by one. The process proceeds to the step 518, and the process from the step 518 to the step 532 is carried out again.

The estimated distribution $f_{k+1}(x,y)$ of the original image acquired as a result of the iterative calculation is set to the distribution f(x,y) of the original image, and the real part of the distribution f(x,y) is output in the step 538. The distribution f(x,y) may be shown on a display, may be stored in a storage device such as a hard disk, or may be transferred to another computer via a communication line.

Figure 3:
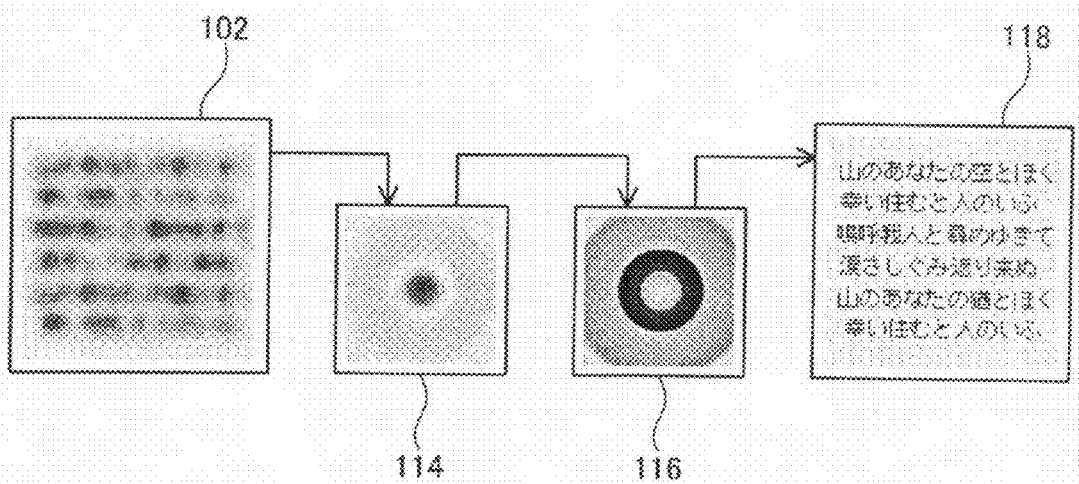
FIG. 3 shows the restoration of an image by means of a method according to the first embodiment of the present invention.

FIG. 3 shows a result of the restoration of an original image from a degraded image according to the above method. Moreover, for a comparison, FIG. 4 shows a result of the restoration of an original image from the same degraded image according to the Richardson-Lucy algorithm.

Figure 4:
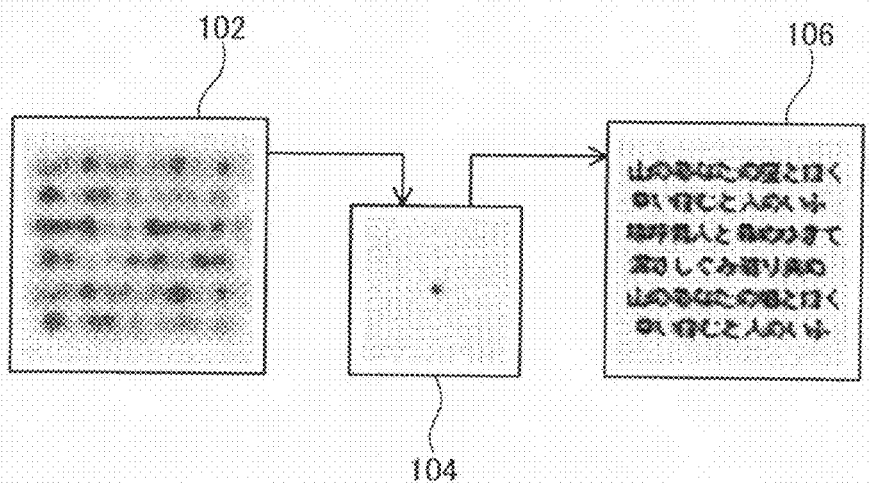
FIG. 4 shows the restoration of an image by means of a method according to prior art.

As shown in FIG. 4, when the restoration is carried out by means of the Richardson-Lucy algorithm, an iterative calculation using a PSF 104 is carried out for a degraded image 102 to restore an original image 106. A distribution of the image when the optical system transfers a point light source is used as the PSF 104. The example shown in FIG. 4 was obtained by repeating the iterative calculation according to the Richardson-Lucy algorithm 500 times. Characters, which cannot be recognized at all in the degraded image 102, are restored on the restored original image 106 to such a degree that one can manage to recognize some of them. However, even if the iterative calculation is repeated further, the restored original image 106 hardly changes.

As shown in FIG. 3, when the restoration is carried out by means of the method according to the present embodiment, the iterative calculation using the OTF provided with an MTF 114 and a PTF 116 is carried out for the degraded image 102 to restore an original image 118. The example shown in FIG. 3 was obtained by repeating the iterative calculation 300 times. Compared with the case employing the Richardson- Lucy algorithm, the characters can be clearly recognized on the original image 118 restored using the method according to the present embodiment.

Though the description given in the above embodiment is of the restoration of a black and white original image, a similar method can be used to restore an original image including colors. If an original image includes colors, distributions fr(x,y), fg(x,y), and fb(x,y) of illuminance of the respective color components R, A, B in the original image can be individually estimated based on distributions gr(x,y), gg(x, y), and gb(x,y) of illuminance of the respective color components R, G, B in a degraded image, and the transfer characteristics of the optical system. For example, the distribution fr(x,y) of the illuminance of the color component R in the original image can be estimated by an iterative calculation based on the distribution gr(x,y) of the illuminance of the color component R in the degraded image, and the H(s,t), which is an OTF. Similarly, the distribution fg(x,y) of the illuminance of the color component G and the distribution fb(x,y) of the illuminance of the color component B in the original image can be estimated. It is possible to restore the original image from the estimated illuminance distributions of the R, G, and B components inn the original image.

Second Embodiment

Figure 5:
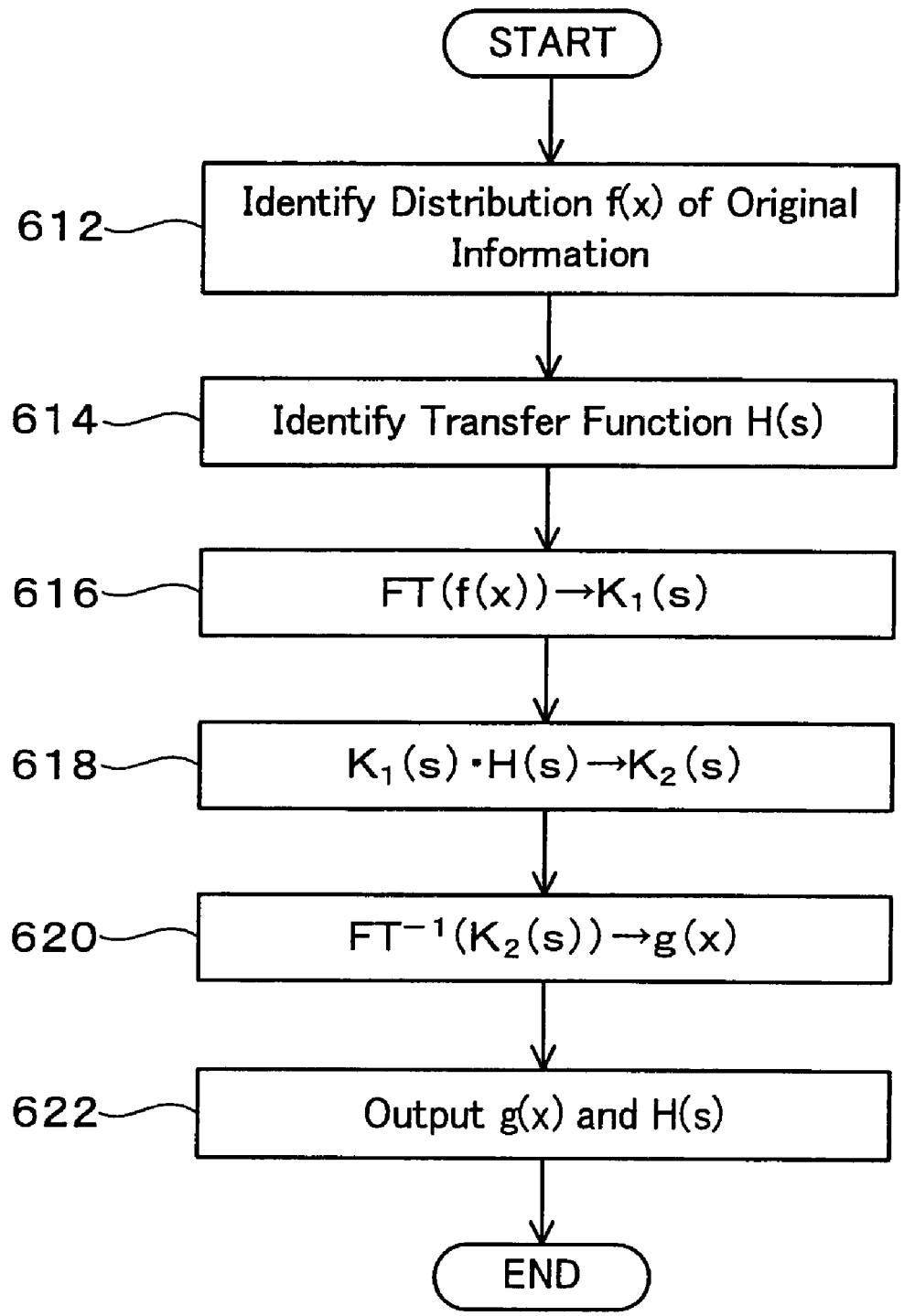
FIG. 5 is a flowchart of the method according to a second embodiment of the present invention.
Figure 6:
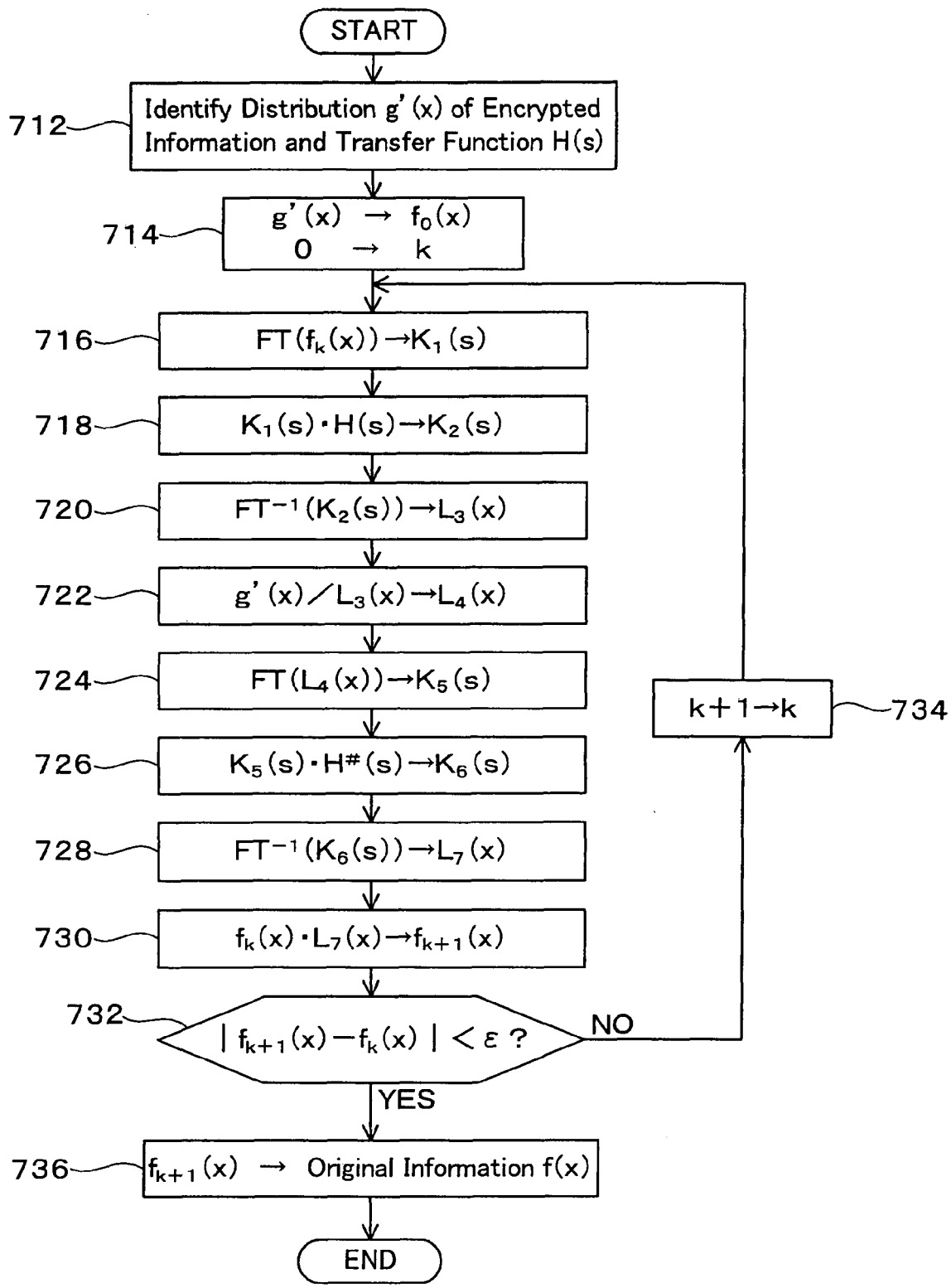
FIG. 6 is a flowchart of the method according to a third embodiment of the present invention.
Figure 7:
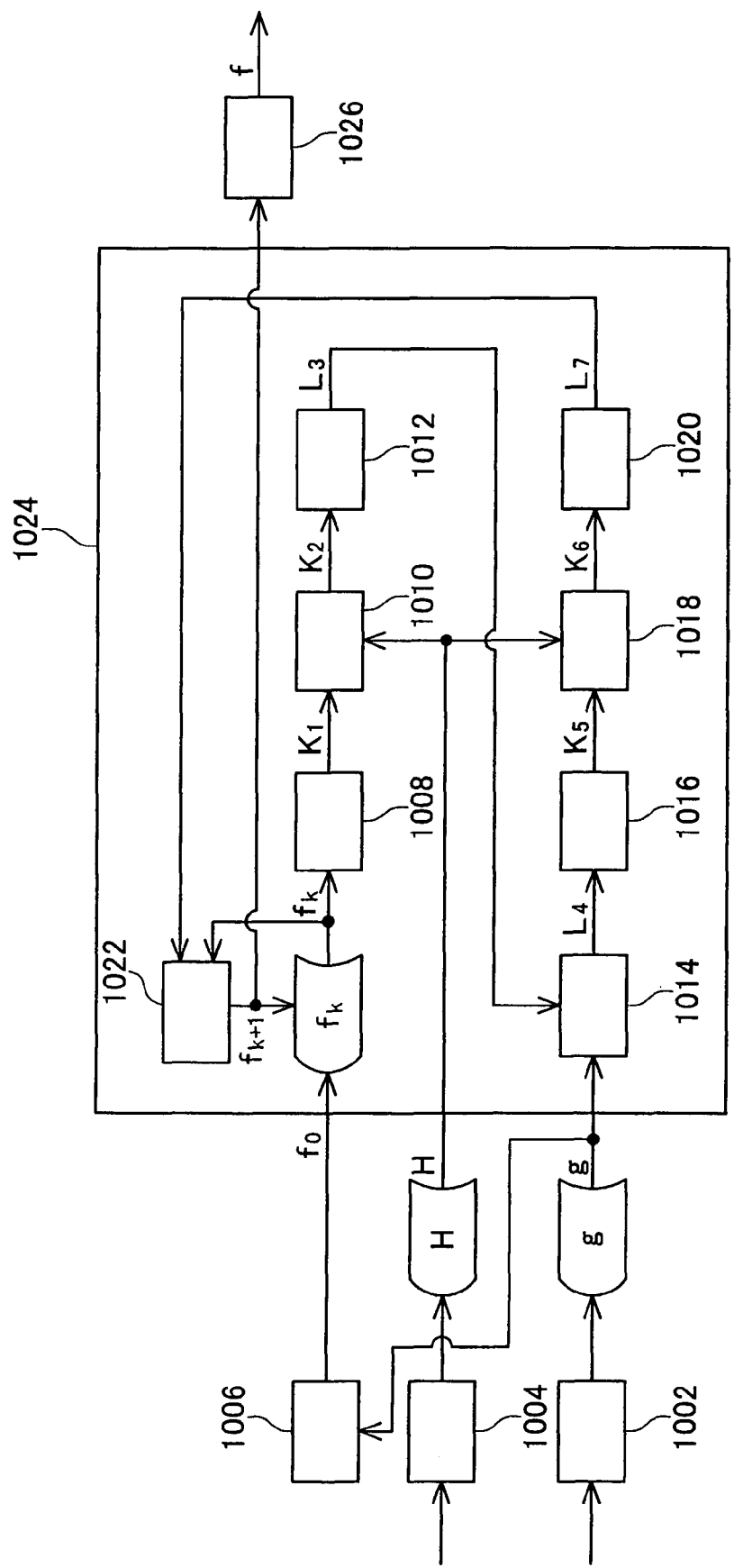
FIG. 7 is a functional block diagram of a restoring device 1000 for degraded information according to the present invention.
Figure 8:
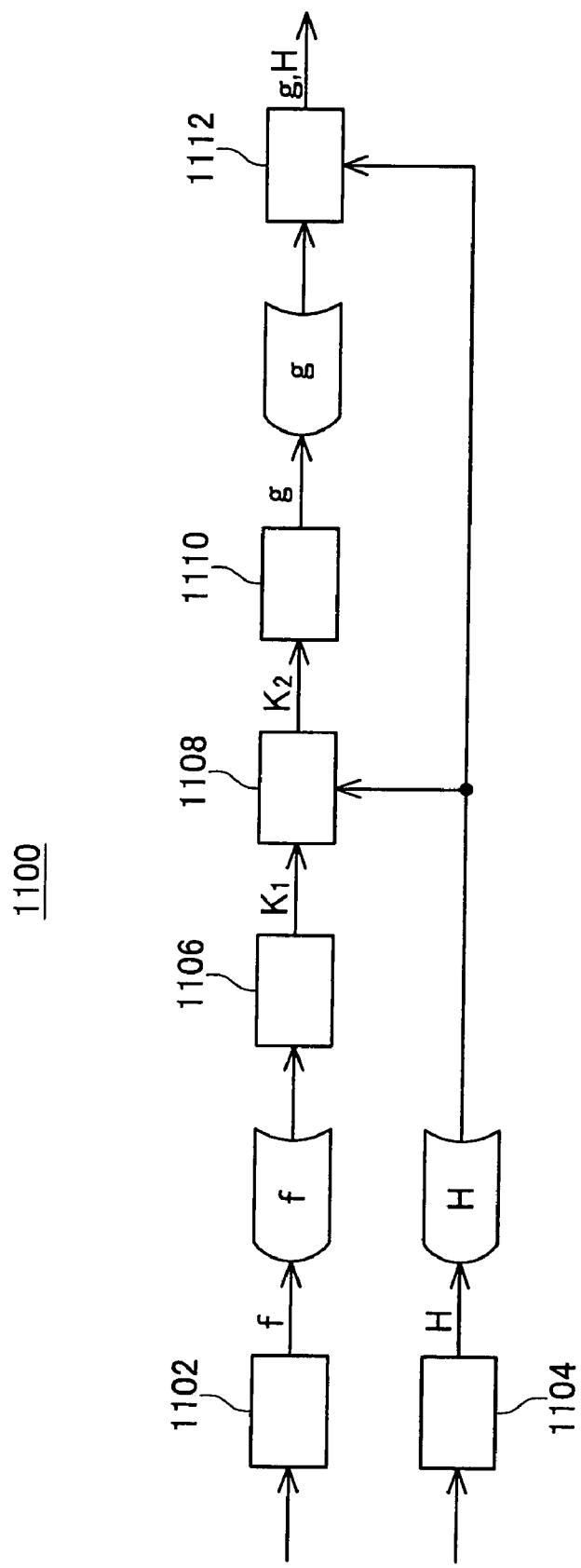
FIG. 8 is a functional block diagram of an encrypting device 1100 for information according to the present invention.
Figure 9:
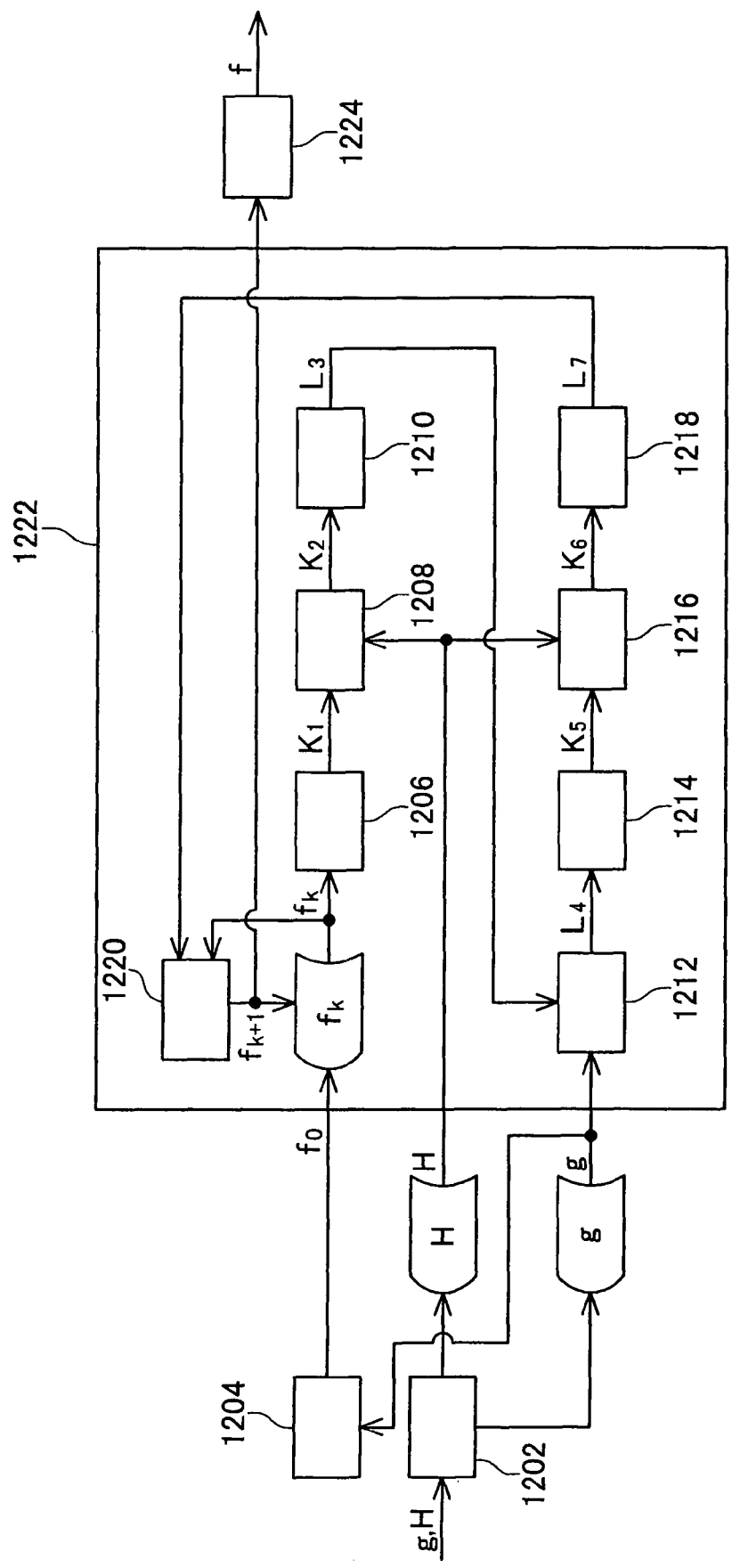
FIG. 9 is a functional block diagram of a decrypting device 1200 for information according to the present invention.
Figure 10:
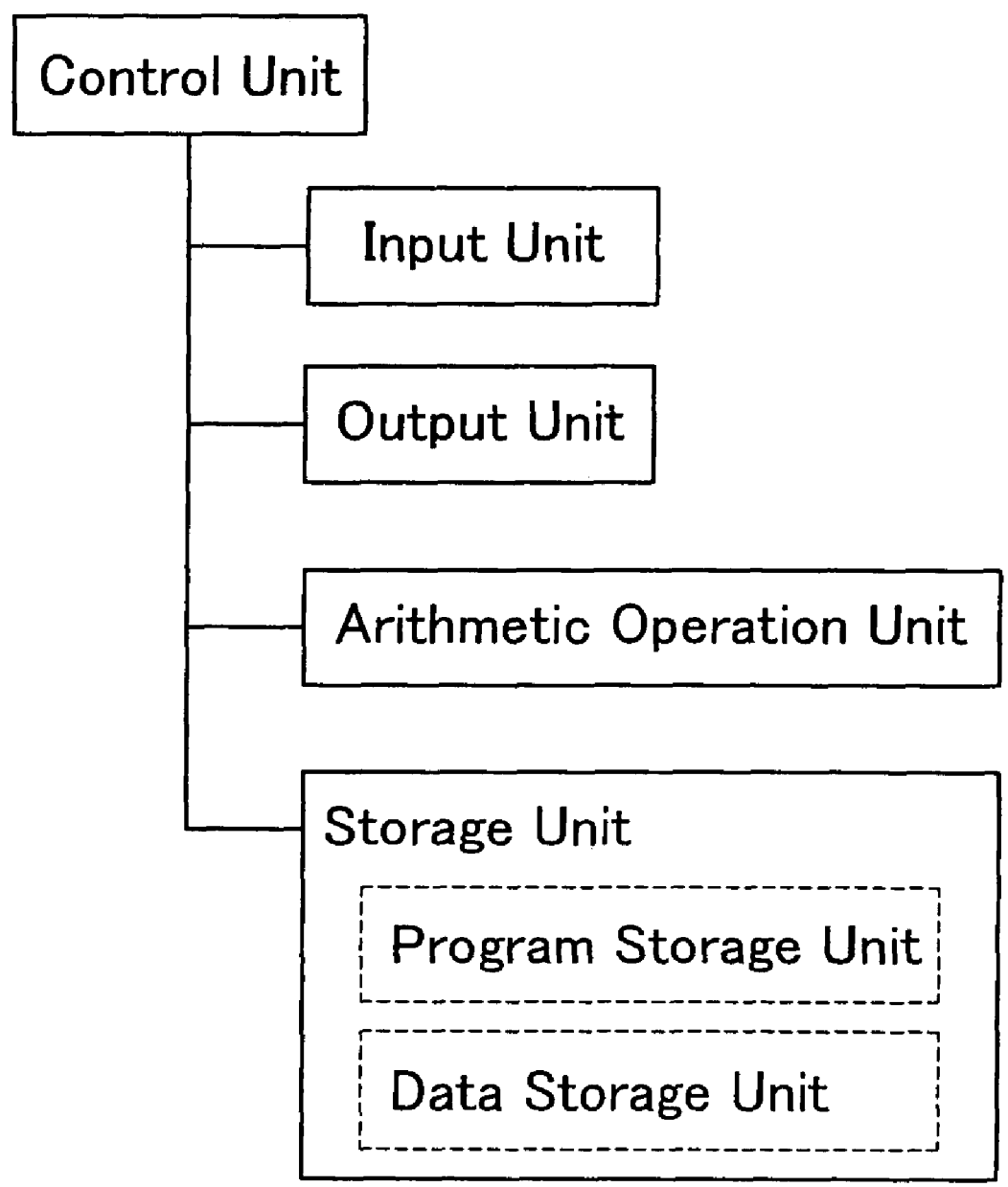
FIG. 10 shows an example of a hardware configuration of a computer.

A description will now be given of another embodiment according to the present invention with reference to drawings. In the present embodiment, a description will be given of a method for encrypting information, and a method for decrypting encrypted information. FIG. 5 is a flowchart describing the method of encryption according to the method of the present embodiment, and FIG. 6 is a flowchart describing the method of decryption according to the method of the present embodiment. The encryption method shown in FIG. 5 encrypts input original information f(x) using a desired transfer function H(s), and outputs a pair of data corresponding to the degraded information g(x) and the transfer function H(s).

A description will now be given of the encryption of the information with reference to FIG. 5.

In the initial step 612, the original information f(x) is identified. In this example original information f(x) comprising a bit string, which represents a combination of high electric potentials and low electric potentials, is handled.

In the step 614, the transfer function H(s) is set. A function whose absolute value is 0 in specific frequency domains is preferably set as the transfer function H(s). This transfer function removes specific frequencies in the course of transfer, and it is thus difficult for a third party to estimate the original information based on the information after the transfer, resulting in an increase in the confidentiality of the cipher.

The transfer function H(s) may be set by a user for all the discretized frequency s, or a function form of the transfer function H(s) may be set in advance and the transfer function H(s) may be set by parameters specified by the user. According to the method of the present embodiment, the transfer function H(s) is defined as the following equation, and the user specifies the value of a parameter σ.

[Equation 22]

$$H(s) = \begin{cases} 1 - \frac{s}{\sigma} & \text{for } |s| \leq \sigma \\ 0 & \text{for } |s| > \sigma \end{cases} \quad (22)$$

In the step 616, the function f(x) input in the step 612 is transformed by means of a Fourier transform, and a result thereof is set as a complex function $K_1(s)$. FT( ) in FIG. 5 denotes the following one-dimensional Fourier transform.

[Equation 23]

$$K_1(s) = \int_{-\infty}^{\infty} f(x(e^{jsx}dx \quad (23)$$

In the step 618, the function $K_2(s)$ is calculated by multiplying the function $K_1(s)$ set in the step 616 by the function H(s) set in the step 614.

In the step 620, the function $K_2(s)$ calculated in the step 618 is transformed by an inverse Fourier transform, and a result thereof is set to the encrypted information g(x).

In the step 622, a pair of data of the encrypted information g(x) and the transfer function H(s) are output. As the transfer function H(s), all the values for all the discretized frequencies s may be output, or only a value of the parameter may be output if the function form of the transfer function H(s) is set in advance and a user has set the value of the parameter. The output of the pair of the data of the encrypted information g(x) and the transfer function H(s) may be stored on a storage device such as a hard disk, may be transferred to another computer via a communication line, or may be printed by a printer onto a sheet which can be read by a computer with a scanner.

The encryption according to the above method removes information within a specific frequency domain of the information contained in the original information f(x), and generates the encrypted information g(x). Since the information within the specific frequency domain is lost from the encrypted information g(x), it is possible to prevent a third party from using the encrypted information g(x) to steal information contained in the original information f(x).

Moreover, since encryption by means of the above method removes high frequency components contained in the original information f(x), the quantity of data in the encrypted information g(x) is reduced compared to the quantity of data in the original information f(x). It is thus possible to compress the quantity of data in the original information f(x) by means of the above method, thereby reducing the load related to the storage and transfer of the information.

Third Embodiment

A description will now be given of another embodiment according to the present invention with reference to FIG. 6. The method according to the present embodiment decrypts information encrypted by the method according to the second embodiment.

In the step 712, a distribution g'(x) of encrypted information and a transfer function H(s) used for the encryption are identified. The method according to the present embodiment receives a pair of data comprising the distribution g(x) of the encrypted information obtained by the method according to the second embodiment, and the transfer function H(s), and identifies g'(x) and H(s) as described below.

The method according to the present embodiment manipulates the distribution g'(x) of the encrypted information to be used in the decryption, and an estimated distribution $f_k(x)$ (k=0, 1, 2, . . . ) of the original information estimated in the process of the iterative calculation as complex functions. The method according to the present embodiment sets the real part of the distribution g'(x) to the distribution g(x) of the encrypted information produced by the method according to the second embodiment, and the imaginary part of the distribution g'(x) is always set to zero.

The transfer function H(s) obtained by the method according to the second embodiment is used as the transfer function H(s). The following data may be input in order to represent the transfer function H(s), values may be input for all the discretized frequency s, or a function form of the transfer function H(s) may be set in advance and only the value of parameters which identify the function form may be input.

In the step 714, the distribution g'(x) is set as the initial estimated distribution $f_0(x)$ of the original information. Moreover, the count k of the iterative calculation is set to zero.

In the step 716, the estimated distribution $f_k(x)$ of the original information is transformed by the Fourier transform, and a result thereof is set as a function $K_1(s)$. The function $K_1(s)$ is a complex function, and corresponds to the first function.

In the step 718, a function $K_2(s)$ is calculated by multiplying the first function $K_1(s)$ set in the step 716 by the transfer function H(s) input in the step 712. The function $K_2(s)$ is a complex function, and corresponds to the second function.

In the step 720, the second function $K_2(s)$ calculated in the step 718 is transformed by an inverse Fourier transform, and a result thereof is set to a function $L_3(x)$. The function $L_3(x)$ is a complex function, and corresponds to the third function.

In the step 722, a function $L_4(x)$ is calculated by dividing the distribution g'(x) of the encrypted information identified in the step 712 by the third function $L_3(x)$ set in the step 720. The function $L_4(x)$ is a complex function, and corresponds to the fourth function.

In the step 724, the fourth function $L_4(x)$ calculated in the step 722 is transformed by the Fourier transform, and a result thereof is set to a function $K_5(s)$. The function $K_5(s)$ is a complex function, and corresponds to the fifth function.

In the step 726, the function $K_6(s)$ is calculated by multiplying the function $K_5(s)$ set in the step 724 by an inverse function $H^\#(s)$ of the transfer function H(s) identified in the step 712. There holds $H^\#(s)=H(-s)$. The function $K_6(s)$ is a complex function, and corresponds to the sixth function.

In the step 728, the sixth function $K_6(s)$ calculated in the step 726 is transformed by the inverse Fourier transform, and a result thereof is set to a function $L_7(x)$. The function $L_7(x)$ is a complex function, and corresponds to the seventh function.

In the step 730, an improved estimated distribution $f_{k+1}(x)$ of the original information is calculated by multiplying the estimated distribution $f_k(x)$ of the original information by the seventh function $L_7(x)$ set in the step 728.

In the step 732, a difference between the improved estimated distribution $f_{k+1}(x)$ of the original information calculated in the step 730 and the estimated distribution $f_k(x)$ of the original information is calculated, and it is determined whether the absolute value thereof is less than a threshold $\epsilon$ for all x. If the absolute value of the difference is greater than or equal to the threshold $\epsilon$ for a certain value of x ("NO" in the step 730), it is determined that the improved estimated distribution $f_{k+1}(x)$ of the original information has not converged, and the process proceeds to the step 734. If the absolute value of the difference is less than the threshold $\epsilon$ for all x ("YES" in the step 730), it is determined that the improved estimated distribution $f_{k+1}(x)$ of the original information has converged, and the process proceeds to the step 736.

In the step 734, the count k of the iterative calculation is incremented by one. The process proceeds to the step 716, and the process from the step 716 to the step 730 is repeated.

In the step 736, the real part of the final estimated distribution $f_{k+1}(x)$ of the original information is output as the final estimated distribution f(x) of the original information.

The above method can restore the encrypted original information. The information in the specific frequency domain removed in the process of the encryption can be precisely restored using the method according to the present embodiment.

Though a detailed description has been given of the embodiments of the present invention, they are simply examples, and are not intended to limit the scope of the claims. The technologies described in the claims include variations and modifications to the exemplified embodiments in various manners.

The technical elements described herein and in the drawings provide technical usefulness solely or in combination, and are not limited to the combinations described in the claims of the application. Moreover, the technologies exemplified herein and in the drawings attain multiple objectives simultaneously, and the technologies can be said to have technical utility if the achieve at least one of those objectives.

The invention claimed is:

1. A method for restoring original information from degraded information comprising:
    identifying a distribution of degraded information represented by a complex probability density function;
    acquiring an optical transfer function for a transfer in a transfer system from original information to the degraded information as a function in the frequency space, the optical transfer function being based on a Fourier transform of characteristics of the transfer system, the optical transfer function including a phase characteristic of the transfer system;
    identifying an initial estimated distribution of the original information represented by a complex probability density function;
    (1) acquiring a first function by applying a Fourier transform to the estimated distribution of the original information;
    (2) acquiring a second function by multiplying the first function by the optical transfer function;
    (3) acquiring a third function by applying an inverse Fourier transform to the second function;
    (4) acquiring a fourth function by dividing the distribution of the degraded information by the third function;
    (5) acquiring a fifth function by applying a Fourier transform to the fourth function;
    (6) acquiring a sixth function by multiplying the fifth function by a phase-reverse function of the optical transfer function;
    (7) acquiring a seventh function by applying an inverse Fourier transform to the sixth function;
    (8) acquiring a next estimated distribution of the original information by multiplying the estimated distribution of the original information by the seventh function;
    replacing the estimated distribution of the original information with the next estimated distribution of the original information, and repeating said steps (1) to (8); and
    outputting restored original information based on the estimated distribution of the original information.

2. A program stored on a non-transitory computer readable medium for causing a computer to execute the respective steps of the method according to claim 1.

3. A device for restoring original information from degraded information comprising:
    means for identifying a distribution of degraded information represented by a complex probability density function;
    means for acquiring an optical transfer function for a transfer in a transfer system from original information to the degraded information as a function in the frequency space, the optical transfer function being based on a Fourier transform of characteristics of the transfer system, the optical transfer function including a phase characteristic of the transfer system;

means for identifying an initial estimated distribution of the original information represented by a complex probability density function;

(1) means for acquiring a first function by applying a Fourier transform to the estimated distribution of the original information;

(2) means for acquiring a second function by multiplying the first function by the optical transfer function;

(3) means for acquiring a third function by applying an inverse Fourier transform to the second function;

(4) means for acquiring a fourth function by dividing the distribution of the degraded information by the third function;

(5) means for acquiring a fifth function by applying a Fourier transform to the fourth function;

(6) means for acquiring a sixth function by multiplying the fifth function by a phase-reverse function of the optical transfer function;

(7) means for acquiring a seventh function by applying an inverse Fourier transform to the sixth function;

(8) means for acquiring a next estimated distribution of the original information by multiplying the estimated distribution of the original information by the seventh function;

means for replacing the estimated distribution of the original information with the next estimated distribution of the original information, and repeating in order to cause said means (1) to (8) to execute processes thereof; and means for outputting restored original information based on the estimated distribution of the original information.

* * * * *